United States Patent
Guerra et al.

(10) Patent No.: US 10,728,700 B2
(45) Date of Patent: Jul. 28, 2020

(54) PRIVACY ASSURANCE IN LOCATION BASED SERVICES

(71) Applicant: SugarCRM Inc., Cupertino, CA (US)

(72) Inventors: Filipe Guerra, San Jose, CA (US); Vladyslav Kulchytskyy, Nashua, NH (US)

(73) Assignee: SUGARCRM INC., Cupertino, CA (US)

( * ) Notice: Subject to any disclaimer, the term of this patent is extended or adjusted under 35 U.S.C. 154(b) by 835 days.

(21) Appl. No.: 14/687,901

(22) Filed: Apr. 15, 2015

(65) Prior Publication Data

US 2016/0309295 A1     Oct. 20, 2016

(51) Int. Cl.
| | |
|---|---|
| *H04M 1/66* | (2006.01) |
| *H04M 1/68* | (2006.01) |
| *H04M 3/16* | (2006.01) |
| *H04W 12/02* | (2009.01) |
| *H04W 4/02* | (2018.01) |
| *H04L 29/06* | (2006.01) |
| *H04L 29/08* | (2006.01) |

(52) U.S. Cl.
CPC ........... *H04W 4/023* (2013.01); *H04L 63/107* (2013.01); *H04L 67/18* (2013.01); *H04W 12/02* (2013.01); *H04L 67/306* (2013.01)

(58) Field of Classification Search
CPC .......... H04W 4/02; H04W 12/02; H04L 67/18
USPC .................... 455/411, 404.2, 414.1; 370/325
See application file for complete search history.

(56) References Cited

U.S. PATENT DOCUMENTS

| | | | | |
|---|---|---|---|---|
| 8,340,726 B1* | 12/2012 | Fujisaki | ................ | H04M 19/04 |
| | | | | 345/168 |
| 8,539,567 B1* | 9/2013 | Logue | ................ | H04L 63/0884 |
| | | | | 709/223 |
| 8,635,373 B1* | 1/2014 | Supramaniam | ........ | H04L 67/42 |
| | | | | 709/228 |
| 8,655,389 B1* | 2/2014 | Jackson | ................ | H04L 67/18 |
| | | | | 455/414.1 |
| 8,750,894 B1* | 6/2014 | Stogaitis | ................ | H04W 4/02 |
| | | | | 370/325 |
| 8,897,817 B1* | 11/2014 | Jackson | ................ | H04L 67/18 |
| | | | | 455/404.2 |
| 9,060,246 B1* | 6/2015 | Fujisaki | ................ | H04M 19/04 |
| 9,241,060 B1* | 1/2016 | Fujisaki | ................ | H04M 19/04 |
| 9,319,876 B2* | 4/2016 | Arunkumar | ........... | H04W 12/02 |
| 9,432,843 B2* | 8/2016 | Arunkumar | ............. | H04W 8/16 |
| 9,585,011 B2* | 2/2017 | Arunkumar | ........... | H04W 12/02 |
| 9,635,547 B1* | 4/2017 | Mincher | ................ | H04W 12/02 |
| 9,763,047 B1* | 9/2017 | Chakra | ................ | H04W 4/023 |
| 9,843,571 B2* | 12/2017 | Uetabira | ................ | H04L 63/08 |
| 2010/0009657 A1* | 1/2010 | Dingler | ................ | H04W 4/02 |
| | | | | 455/411 |

(Continued)

*Primary Examiner* — William D Cumming
(74) *Attorney, Agent, or Firm* — Steven M. Greenberg, Esq.; Shutts & Bowen LLP

(57) ABSTRACT

A method, system and computer program product for privacy assurance in location based services is provided. The method includes receiving a location of a mobile device corresponding to an end user of a multi-user enterprise application. The method additionally includes identifying a valid location of the mobile device that is at least a threshold distance from the received location and that is a public facility. Finally, the method includes presenting the valid location to other end users in the multi-user enterprise application in lieu of the received location.

20 Claims, 2 Drawing Sheets

(56) References Cited

U.S. PATENT DOCUMENTS

| | | | | |
|---|---|---|---|---|
| 2015/0062158 A1* | 3/2015 | Hildreth | ............ | G02B 27/0172 |
| | | | | 345/633 |
| 2015/0143461 A1* | 5/2015 | Uetabira | ............... | H04W 4/029 |
| | | | | 726/3 |
| 2016/0301674 A1* | 10/2016 | Uetabira | ............... | H04W 4/029 |
| 2016/0309295 A1* | 10/2016 | Guerra | ................. | H04W 12/02 |
| 2017/0149758 A1* | 5/2017 | Uetabira | ................. | H04L 63/08 |

\* cited by examiner

PRIVACY ASSURANCE IN LOCATION BASED SERVICES

BACKGROUND OF THE INVENTION

Field of the Invention

The present invention relates to location based services and more particularly to user location reporting for location based services.

Description of the Related Art

A location-based service is a software-driven service provided to data network connected mobile devices including smart phones, tablet personal computers and notebook computers. The location-based services processes a location determined for a corresponding mobile device and performs ancillary data processing based upon the determined location. The location-based service can be provided remotely from the mobile device, or the location based service can be included as part of the mobile device. In either circumstance, the location based service can be query-based and provide the end user with useful information based upon a determined location of the mobile device, or the location based service can be push-based and deliver data to the mobile device based upon the determined location.

A location based service requires different interoperable components to function. Essential amongst those components are the mobile device itself, location determining circuitry disposed in the mobile device, such as global positioning system (GPS) sensor and corresponding firmware, a computer communications network over which data pertaining to a determined location can be received by or provided from the mobile device, and an ancillary application executing in the mobile device and processing a determined location in order to transmit or receive geographically relevant data. Other components may include a content provider coupled to the mobile device and enabled to provide content responsive to a determined location for a mobile device.

Location based services typically are associated with individual marketing in which marketing messaging or is provided to each individual mobile device based upon a contemporaneous location determined for each individual mobile device. However, location based services can be of enormous benefit when applied in the enterprise setting. Of particular interest, location based services have been proven helpful in fleet management and logistics in which knowing the precise location of different employees facilitates the determination of the efficient utilization of the different employees. Yet, the prospective use of location based services in the enterprise comes at a cost-privacy. To wit, publicizing the location of an end user to other end users of an ancillary application in the enterprise at times can be so undesirable for the end user so as to discourage the adoption of location based services with respect to the ancillary application in the enterprise.

BRIEF SUMMARY OF THE INVENTION

Embodiments of the present invention address deficiencies of the art in respect to location based services and provide a novel and non-obvious method, system and computer program product for privacy assurance in location based services. In an embodiment of the invention, a privacy assurance method for location based services is provided. The method includes receiving a location of a mobile device corresponding to an end user of a multi-user enterprise application. The method additionally includes identifying a valid location of the mobile device that is at least a threshold distance from the received location and that is a public facility. Finally, the method includes presenting the valid location to other end users in the multi-user enterprise application in lieu of the received location.

In one aspect of the embodiment, the public facility is a public landmark proximate to the received location but that is at least the threshold distance from the received location. For instance, the landmark is a monument or park. In another aspect of the embodiment, the public facility is a nearby road that is at least the threshold distance from the received location. In even yet another aspect of the embodiment, a privacy preference is determined for the end user. Thereafter, the valid location is presented to the other end users in the multi-user enterprise application in lieu of the received location only if the privacy preference is enabled. Otherwise the received location is presented to the other end users in the multi-user enterprise application.

In another embodiment of the invention, an enterprise data processing system is configured for privacy assurance in location based services. The system includes a host computing system that includes one or more computers, each with memory and at least one processor. The system also includes a multi-user enterprise application executing in the host computing system and coupled to different mobile devices over a computer communications network. Finally, the system includes a privacy assurance module executing by a processor either in the memory of the mobile device, or in the memory of the host computing system. The module includes program code enabled upon execution by a processor to receive a location of one of the mobile devices corresponding to an end user of the multi-user enterprise application, to identify a valid location of the one of the mobile devices that is at least a threshold distance from the received location and that is a public facility, and to present the valid location to other end users in the multi-user enterprise application in lieu of the received location.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for privacy assurance in location based services. In accordance with an embodiment of the invention, a privacy mode can be established for a location based service. While in the privacy mode for an end user, a location can be determined for the end user. Thereafter, one or more geographically proximate alternate locations can be identified. Finally, the determined location can be changed to an identified geographically proximate alternate location and reported to other end users in lieu of the determined location. In this way, the determined location of the end user can be maintained in confidence while reporting a reasonable substitute location sufficient to locate the end user for the other end users within reasonable proximity to the determined location.

Figure 1:
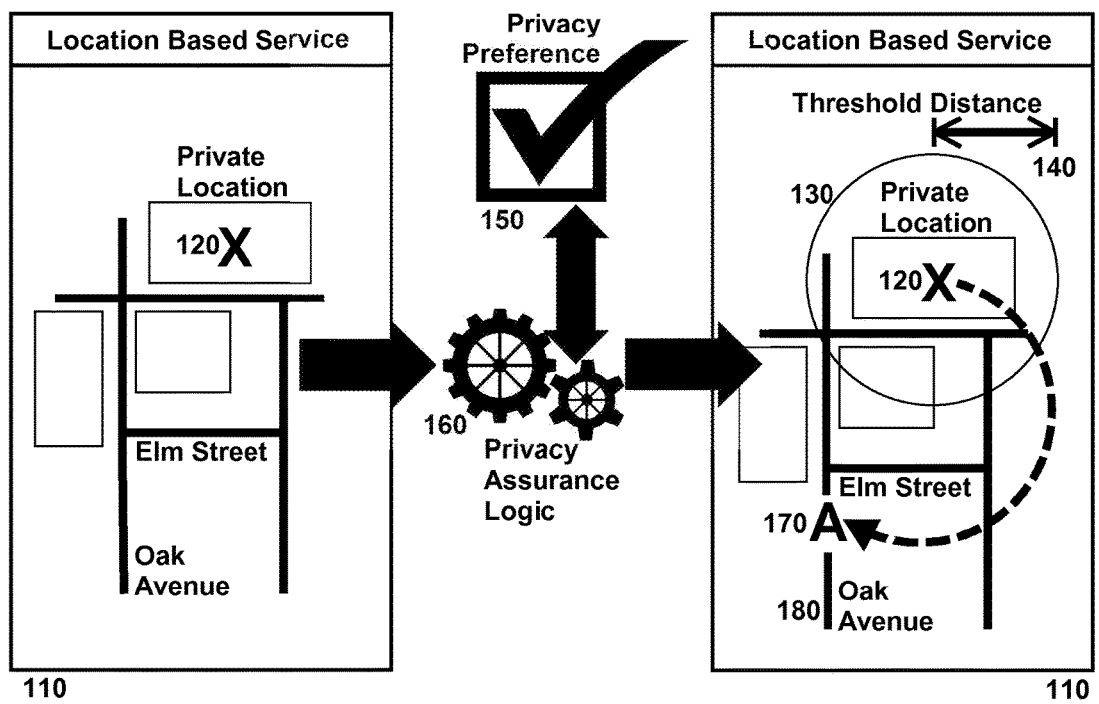
FIG. 1 is a pictorial illustration of a process for privacy assurance in location based services.

In further illustration, FIG. 1 pictorially shows a process for privacy assurance in location based services. As shown in FIG. 1, a location based service 110 can provide for a determined location 120 of an end user of an enterprise application. The determined location 120 can be computed based upon data generated by or in connection with a mobile device corresponding to the end user, such as GPS data or data extrapolated from transmitted data packets from the mobile device. The determined location 120 can be computed irrespective of any preference of privacy by the end user of the mobile device.

Privacy assurance logic 160 can inspect a privacy preference 150 for the end user. If the privacy preference 150 indicates a choice of privacy for the end user, the privacy assurance logic can select an alternate location 170 for the end user geographically disposed at least a threshold distance 140 away from the determined location 120 defining a radius 130 about the determined location 120. The alternate location 170 in particular is associated with a public facility 180 such as a road or landmark like a park or monument. In this way, the actual location of the end user is blurred from the determined location 120 to the alternate location 170 so as to protect the elected privacy of the end user.

Figure 2:
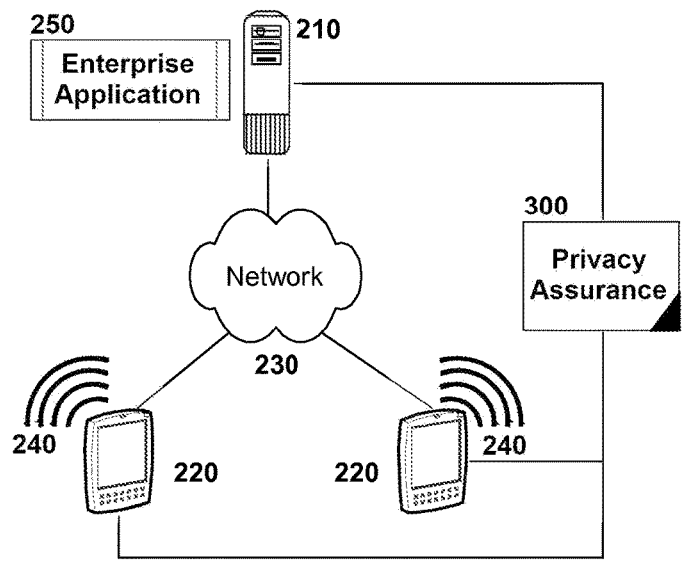
FIG. 2 is a schematic illustration of an enterprise data processing system configured for privacy assurance in location based services; and, FIG. 3 is a flow chart illustrating a process for privacy assurance in location based services.

The process described in connection with FIG. 1 can be implemented within an enterprise data processing system. In yet further illustration, FIG. 2 schematically shows an enterprise data processing system configured for privacy assurance in location based services. The system includes a host computing system 210 that includes one or more computers, each with memory and at least one processor. The host computing system 210 supports the execution of an enterprise application such as a customer relationship management (CRM) application, accessible over a computer communications network 230 by different end users each utilizing a correspondingly different mobile device 220.

Each mobile device 220 includes location circuitry 240 such as a GPS system configured to locate the mobile device 220, generally in respect to geographic coordinates convertible to a real location on a map. Each mobile device 220 further includes a logical coupling to a privacy assurance module 300. The privacy assurance module 300 includes program code that executes either in the memory of the host computing system 210 or within each mobile device 220. The program code is enabled upon execution by a processor to receive a location of one of the mobile devices 220 corresponding to an end user of the enterprise application 250, to identify a valid location of the one of the mobile devices 220 that is at least a threshold distance from the received location and that is a public facility, and to present the valid location to other end users in the enterprise application 250 in lieu of the received location.

Figure 3:
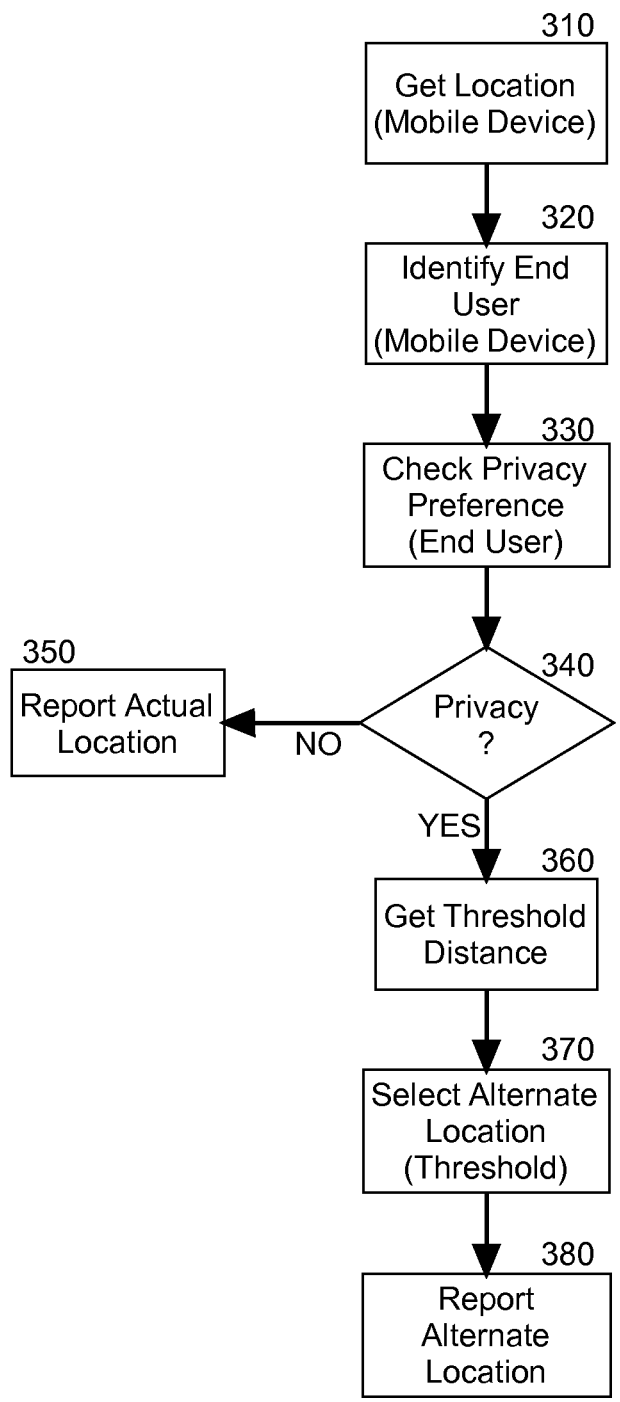

In even yet further illustration of the operation of the privacy assurance module 300, FIG. 3 is a flow chart illustrating a process for privacy assurance in location based services. Beginning in block 310, a location of a mobile device can be received. In block 320, an end user for the mobile device is identified and in block 330, a privacy preference is determined for the end user. In decision block 340, if privacy is not selected, the actual location of the end user as received is reported to the location based service. Otherwise, in block 360, a pre-determined threshold distance from the actual location is retrieved and one or more alternate locations subsisting at least the threshold distance from the actual location are selected in block 370. Each of the alternate locations must correspond to a public facility such as a road or landmark as in a park or monument. Finally, in block 380, one of the alternate locations is reported to the location based service in lieu of the actual location of the mobile device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A privacy assurance method for location based services, the method comprising:
    computing a location for a mobile device corresponding to an end user of a multi-user enterprise application;
    identifying a valid location of the mobile device that is at least a threshold distance from the computed location and that is a public facility; and,
    blurring the computed location to other end users of the multi-user application by presenting the identified valid location to the other end users in the multi-user enterprise application in lieu of the computed location so as to maintain confidential the computed location while instead revealing as a location of the end user a location that is not the computed location but close to the computed location.

2. The method of claim 1, wherein the public facility is a public landmark proximate to the computed location but that is at least the threshold distance from the received location.

3. The method of claim 1, wherein the public facility is a nearby road that is at least the threshold distance from the computed location.

4. The method of claim 2, wherein the landmark is a monument.

5. The method of claim 2, wherein the landmark is a park.

6. The method of claim 1, further comprising:
determining a privacy preference for the end user; and,
presenting the valid location to the other end users in the multi-user enterprise application in lieu of the computed location only if the privacy preference is enabled, but otherwise presenting the computed location to the other end users in the multi-user enterprise application.

7. An enterprise data processing system configured for privacy assurance in location based services, the system comprising:
a host computing system that includes one or more computers, each with memory and at least one processor;
a multi-user enterprise application executing in the host computing system and coupled to different mobile devices over a computer communications network; and,
a privacy assurance module comprising program code enabled upon execution by a processor to compute a location for one of the mobile devices corresponding to an end user of the multi-user enterprise application, to identify a valid location of the one of the mobile devices that is at least a threshold distance from the computed location and that is a public facility, and to blur the computed location to other end users of the multi-user application by presenting the identified valid location to the other end users in the multi-user enterprise application in lieu of the computed location so as to maintain confidential the computed location while instead revealing as a location of the end user a location that is not the computed location but close to the computed location.

8. The system of claim 7, wherein the privacy assurance module executes by a processor in the one of the mobile devices.

9. The system of claim 7, wherein the privacy assurance module executes by a processor in the one of the computers of the host computing system.

10. The system of claim 7, wherein the public facility is a public landmark proximate to the computed location but that is at least the threshold distance from the computed location.

11. The system of claim 7, wherein the public facility is a nearby road that is at least the threshold distance from the computed location.

12. The system of claim 10, wherein the landmark is a monument.

13. The system of claim 10, wherein the landmark is a park.

14. The system of claim 7, wherein the program code is further enabled to determine a privacy preference for the end user and to present the valid location to the other end users in the multi-user enterprise application in lieu of the computed location only if the privacy preference is enabled, but otherwise to present the computed location to the other end users in the multi-user enterprise application.

15. A computer program product for privacy assurance in location based services, the computer program product comprising a computer readable storage medium having program instructions embodied therewith, the program instructions executable by a device to cause the device to perform a method comprising:
computing a location for a mobile device corresponding to an end user of a multi-user enterprise application;
identifying a valid location of the mobile device that is at least a threshold distance from the computed location and that is a public facility; and,
blurring the computed location to other end users of the multi-user application by presenting the identified valid location to the other end users in the multi-user enterprise application in lieu of the computed location so as to maintain confidential the computed location while instead revealing as a location of the end user a location that is not the computed location but close to the computed location.

16. The computer program product of claim 15, wherein the public facility is a public landmark proximate to the computed location but that is at least the threshold distance from the computed location.

17. The computer program product of claim 15, wherein the public facility is a nearby road that is at least the threshold distance from the computed location.

18. The computer program product of claim 16, wherein the landmark is a monument.

19. The computer program product of claim 16, wherein the landmark is a park.

20. The computer program product of claim 15, wherein the method further comprises:
determining a privacy preference for the end user; and,
presenting the valid location to the other end users in the multi-user enterprise application in lieu of the computed location only if the privacy preference is enabled, but otherwise presenting the computed location to the other end users in the multi-user enterprise application.

* * * * *